US012562332B1

(12) United States Patent
Saldana

(10) Patent No.: US 12,562,332 B1
(45) Date of Patent: Feb. 24, 2026

(54) IMAGE INTENSIFIER WITH DYNAMIC OPTOCOUPLER ELEMENTS

(71) Applicant: Michael R. Saldana, New Braunfels, TX (US)

(72) Inventor: Michael R. Saldana, New Braunfels, TX (US)

(73) Assignee: Michael R. Saldana, New Braunfels, TX (US)

( * ) Notice: Subject to any disclaimer, the term of this patent is extended or adjusted under 35 U.S.C. 154(b) by 216 days.

(21) Appl. No.: 18/375,208

(22) Filed: Sep. 29, 2023

(51) Int. Cl.

| | |
|---|---|
| ***H01J 31/50*** | (2006.01) |
| ***H01J 29/02*** | (2006.01) |
| ***H01J 29/04*** | (2006.01) |
| ***H01J 29/96*** | (2006.01) |

(52) U.S. Cl.
CPC .......... *H01J 31/507* (2013.01); *H01J 29/023* (2013.01); *H01J 29/04* (2013.01); *H01J 29/96* (2013.01); *H01J 2231/50026* (2013.01); *H01J 2231/5016* (2013.01)

(58) Field of Classification Search
CPC .......... H01J 29/023; H01J 29/04; H01J 29/96; H01J 31/507; H01J 2231/50026; H01J 2231/5016
See application file for complete search history.

(56) References Cited

U.S. PATENT DOCUMENTS

2013/0320192 A1* 12/2013 Saldana ................ G02B 23/12 250/214 VT

* cited by examiner

*Primary Examiner* — Mark R Gaworecki
(74) *Attorney, Agent, or Firm* — PATENT CAPITAL GROUP

(57) ABSTRACT

There is disclosed a gated power supply for a night vision system includes an input terminal to receive source power, and output terminal to electrically couple to a photocathode, a first voltage source to source a positive or neutral voltage to the photocathode, a second voltage source to source a large negative voltage to the photocathode, and a switching circuit to switch between the first voltage source and the second voltage source on a duty cycle, wherein the switching circuit comprises an optical switch.

20 Claims, 7 Drawing Sheets

IMAGE INTENSIFIER WITH DYNAMIC OPTOCOUPLER ELEMENTS

FIELD OF THE SPECIFICATION

This application relates to the field of night vision systems, and more particularly to an image intensifier with a dynamic optocoupler elements.

BACKGROUND

Image intensifiers are used in so-called "night vision" systems. The structure of an image intensifier comprises a gallium arsenide (GaAs) or similar photocathode, a microchannel plate (MCP), and a phosphor screen. When illuminated by an incident photon beam, the photocathode emits electrons into the vacuum space between the photocathode and MCP. The electrons are accelerated toward the MCP by an applied voltage. The electrons enter the channels of the MCP, where each photon is accelerated along a single channel by a large negative voltage difference between the input face and the output face. As the photon is accelerated, it strikes the walls of the microchannel, releasing additional photons. Thus, by the process of secondary electron emission, the MCP amplifies the incident electron flux up to thousands of times. The electrons exiting the MCP are accelerated toward the screen and converted back to light by the phosphor layer on the screen. The result is an image with the brightness strongly multiplied.

BRIEF DESCRIPTION OF THE DRAWINGS

The present disclosure is best understood from the following detailed description when read with the accompanying FIGURES. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion. Furthermore, the various block diagrams illustrated herein disclose only one illustrative arrangement of logical elements. Those elements may be rearranged in different configurations, and elements shown in one block may, in appropriate circumstances, be moved to a different block or configuration.

SUMMARY

Figure 1:
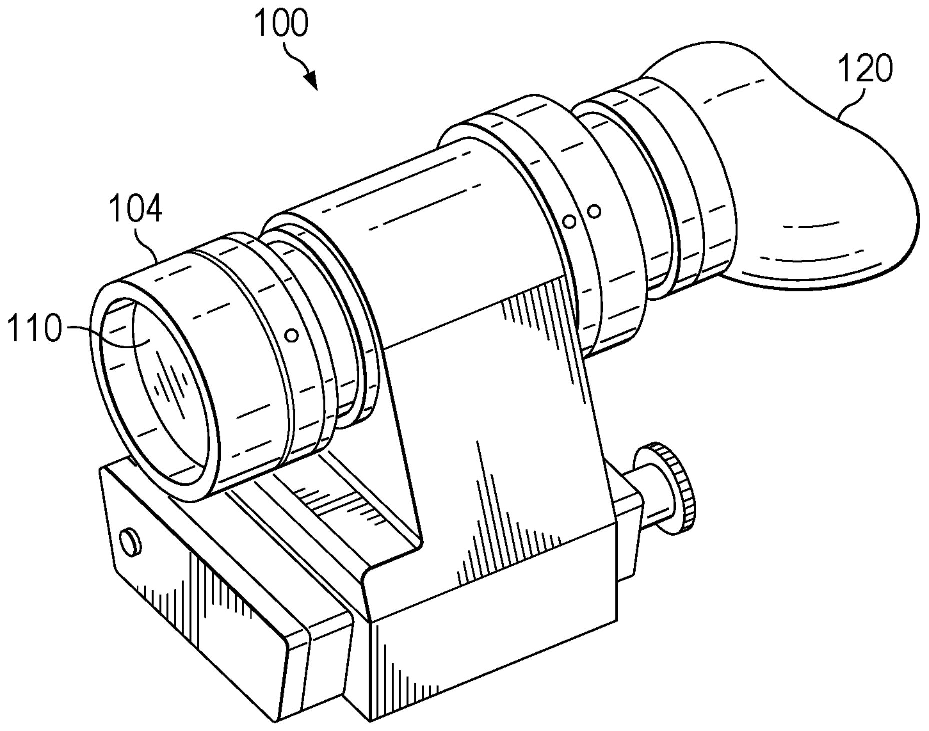
FIG. 1 is a perspective view of selected elements of a night vision device according to one or more examples of the present specification.

There is disclosed a gated power supply for a night vision system comprising an input terminal to receive source power, and output terminal to electrically couple to a photocathode, a first voltage source to source a positive or neutral voltage to the photocathode, a second voltage source to source a large negative voltage to the photocathode, and a switching circuit to switch between the first voltage source and the second voltage source on a duty cycle, wherein the switching circuit comprises an optical switch.

EMBODIMENTS OF THE DISCLOSURE

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

Overview

This specification describes an image intensifier and an associated high-voltage power supply. In some contexts, it is advantageous to make the high-voltage power supply very small, to decrease weight and increase the portability of the image intensifier. For example, image intensifiers may be head-mounted, mounted as gun sights, or may be standalone viewers. In any of these contexts, reducing weight and size may be viewed as benefits by the end user.

In some contexts, image intensifiers may require switching circuits. For example, it may be desirable for an image intensifier to use a gated power supply. In an example, the voltage applied to the photocathode is switched alternately between negative and positive polarities, effectively turning the image intensifier on and off on a frequency such that the switching is not perceptible by a human user (e.g., greater than approximately 45 cycles per second). Operating an image intensifier in this manner provides enhanced imaging performance compared to non-gated operation. In gated operation, the voltage applied to the photocathode during each "on" cycle is at its full nominal voltage, resulting in enhanced imaging resolution for the image intensifier, regardless of the input illumination level. In non-gated operation, the voltage applied to the photocathode is analog and is reduced as the input illumination increases to prevent damage to the image intensifier. This reduction in voltage may result in decreased resolution. Certain advantage of a gated image intensifier are most visible during higher ambient light conditions, where gating reduced brightness while maintaining a high-resolution image.

A potential downside of a switched power supply is that it inherently requires switches. Because the power supply is a high-voltage system, the switches may typically be realized in high-voltage metal oxide semiconductor field effect transistors (MOSFET) or bipolar junction transistors (BJT).

While transistors provide effective switching, they are relatively large discrete parts, which drive increased size of the power supply.

The present specification provides an illustrative high-voltage power supply that can be realized without requiring high-voltage transistors. Instead, high voltage photodiodes may be used as the gating component. Photodiodes are sensitive to light. The reverse leakage current of a photodiode varies as a function of incident light, and thus can be used as a controlled impedance device. In the extreme high impedance circuits formed by elements of the image intensifier, which are typically in the giga-ohm to tera-ohm range, the range of impedance provided by optically coupled photodiodes can effectively behave as a switch. The control input for a photodiode may be a small light-emitting diode (LED), such as an infrared LED, placed to optically couple to the photodiode when it is on. The photodiode-LED combination may be potted together to optically isolate the system from ambient light sources. This combination may, in some cases, be substantially smaller and lighter than the high-voltage transistors that would otherwise be used. An external control circuit may be used to control the LED, and thus select the duty cycle of the switched power supply.

In some cases, the photodiode need not be specifically manufactured as a photodiode. Rather, the photodiode may simply be a standard high-voltage semiconductor diode that has not been potted or encapsulated. Such an unpotted silicon device may be inherently photo sensitive. Thus, placing an unpotted diode next to a light source such as an LED, and then encapsulating the pair as a unit, may effectively form a small and efficient high-voltage photo switch. This photo switch may be smaller, lighter, and simpler than a high-power MOSFET.

To further decrease the size of the power supply, other elements may also be manufactured from unpotted diodes. For example, the power supply may include a charge pump circuit, which is used to step up the voltage many times, thus providing the high voltages desirable in an image intensifier. Using a series of individually-packaged diodes may result in a larger circuit. In contrast, smaller, unpackaged diodes may be used to keep the circuit smaller. The unpackaged diodes will also be photosensitive, which in this case may be an undesirable attribute. In that case, the power supply circuit as a whole (or portions thereof) may be potted for optical isolation.

Experimentally, a power supply for an image intensifier built according to the teachings of this specification had dimensions, from a plan view perspective (top-down) of less than 1.0 inches on each side, and an overall thickness of less than a quarter of an inch.

While the power supply of the present specification is disclosed in the context of an image intensifier, as used throughout the attached figures, this illustration is nonlimiting. The power supply disclosed may also be used in other contexts where a small, lightweight, switched power supply is desirable.

Selected Examples

The foregoing can be used to build or embody several example implementations, according to the teachings of the present specification. Some example implementations are included here as nonlimiting illustrations of these teachings.

Example 1 includes a gated power supply for an image intensifier comprising an input terminal to receive source power, and output terminal to electrically couple to a photocathode, a first voltage source to source a non-active voltage to the photocathode, a second voltage source to source a large negative voltage to the photocathode, and a switching circuit to switch between the first voltage source and the second voltage source on a duty cycle, wherein the switching circuit comprises an optically-coupled switch.

Example 2 includes the gated power supply of example 1, wherein the optically-coupled switch comprises a high-voltage unencapsulated diode proximate to a light source controlled by the switching circuit.

Example 3 includes the gated power supply of example 2, wherein the light source is an infrared light-emitting diode.

Example 4 includes the gated power supply of example 1, further comprising an input terminal to receive source power, and a voltage multiplier circuit to multiply the source power to the large negative voltage.

Example 5 includes the gated power supply of example 4, wherein the voltage multiplier circuit comprises a charge pump.

Example 6 includes the gated power supply of example 5, wherein the charge pump comprises a plurality of unencapsulated high-voltage diodes.

Example 7 includes the gated power supply of example 1, wherein the first voltage source is approximately +40V.

Example 8 includes the gated power supply of example 1, wherein the second voltage source is greater than 500V in magnitude from the first voltage source.

Example 9 includes the gated power supply of example 1, wherein the second voltage source is approximately −800V.

Example 10 includes the gated power supply of example 1, further comprising an automatic brightness control circuit.

Example 11 includes the gated power supply of any of examples 1-10, wherein the gated power supply is potted within an encapsulant compound.

Example 12 includes the gated power supply of example 11, wherein the encapsulant compound is a silicone compound.

Example 13 includes the gated power supply of example 11, wherein the encapsulant compound is an epoxy compound.

Example 14 includes the gated power supply of example 11, wherein the encapsulant compound is a urethane compound.

Example 15 includes the gated power supply of example 11, wherein the encapsulant compound is a thermally-conductive compound.

Example 16 includes an image intensification system, comprising: an image intensifier assembly comprising a photocathode coupled via a vacuum to a microchannel plate (MCP) electrically coupled to a screen; a battery power source to provide a supply voltage; a control circuit, including or operating with a pulse width modulator (PWM); and a switching power supply, comprising: a voltage multiplier circuit to multiply the supply voltage to a large negative voltage; a first supply circuit to provide a first operational voltage from the large negative voltage to the photocathode, wherein the first supply circuit comprises a pair of switches configured to operate out of phase of one another, based on the PWM, wherein a first switch is in an inactive mode when a second switch is in an active mode, and wherein the first switch is coupled to a neutral or positive supply and the second switch is coupled to a negative supply, wherein the first and second switches are optically actuated; and a second supply circuit to provide a second operational voltage to the MCP, comprising a linear element in series with an internal impedance of the MCP, wherein the linear element is a variable impedance optical circuit controlled by a control voltage.

Example 17 includes the image intensification system of example 16, wherein the voltage multiplier circuit comprises a charge pump.

Example 18 includes the image intensification system of example 17, wherein the charge pump comprises a plurality of unencapsulated high-voltage diodes.

Example 19 includes the image intensification system of example 16, wherein second voltage is between 0V and +40V.

Example 20 includes the image intensification system of example 16, wherein the large negative voltage is greater than 500V in magnitude.

Example 21 includes the image intensification system of example 16, wherein the large negative voltage is approximately −800V.

Example 22 includes the image intensification system of any of examples 16-21, wherein the switching power supply is potted within an encapsulant.

Example 23 includes the image intensification system of example 22, wherein the encapsulant is a silicone compound.

Example 24 includes the image intensification system of example 22, wherein the encapsulant is an epoxy compound.

Example 25 includes the image intensification system of example 22, wherein the encapsulant is a urethane compound.

Example 26 includes the image intensification system of example 22, wherein the encapsulant is a thermally-conductive compound.

Example 27 includes the image intensification system of any of examples 16-26, wherein the linear element comprises a light-emitting diode (LED) optically coupled to an optical diode.

Example 28 includes the image intensification system of example 27, wherein the LED is an infrared LED.

Example 29 includes the image intensification system of example 27, wherein the LED has a brightness that varies directly with an input voltage.

Example 30 includes the image intensification system of example 16, wherein the control voltage varies from substantially 0V to substantially 12V.

Example 31 includes the image intensification system of example 16, wherein the first and second operational voltages are large negative voltages.

Example 32 includes the image intensification system of example 16, wherein the control voltage is provided by a control circuit comprising an error integrator.

Example 33 includes the image intensification system of example 16, wherein the control voltage is provided by a control circuit comprising a voltage regulator.

Example 34 includes the image intensification system of example 16, wherein the control voltage is provided by a control circuit comprising a microcontroller.

Example 35 includes the image intensification system of any of examples 16-34, wherein the system comprises a night vision monocular.

Example 36 includes the image intensification system of any of examples 16-34, wherein the system comprises a night vision rifle scope Example 37 includes the image intensification system of any of examples 16-34, wherein the system comprises a night vision binoculars.

Example 38 includes the image intensification system of any of examples 16-34, wherein the system comprises a night vision digital camera.

Example 39 includes a discretely packaged power supply component, comprising: a first input terminal to receive a source power; a second input terminal to receive a switching signal from a pulse width modulator; an output terminal to provide a switched high-voltage output; a voltage multiplier circuit to step up the source power to a high-magnitude direct current (DC) voltage; and an optical switch comprising a light-emitting diode (LED) to operate on the switching signal, wherein the LED is proximate to an unencapsulated high-voltage diode disposed to switch the output terminal between the high-magnitude DC voltage and a neutral or small-magnitude voltage of opposite polarity to the high-magnitude DC voltage; wherein the discretely packaged power supply component is potted within an encapsulant.

Example 40 includes the discretely packaged power supply component of example 39, wherein the LED is an infrared LED.

Example 41 includes the discretely packaged power supply component of example 39, wherein the voltage multiplier circuit comprises a charge pump.

Example 42 includes the discretely packaged power supply component of example 41, wherein the charge pump comprises a plurality of unencapsulated high-voltage diodes.

Example 43 includes the discretely packaged power supply component of example 39, wherein the neutral or small-magnitude voltage is between 0V and +40V.

Example 44 includes the discretely packaged power supply component of example 39, wherein the high-magnitude DC voltage has a magnitude of at least 500V.

Example 45 includes the discretely packaged power supply component of example 39, wherein the high-magnitude DC voltage is approximately −800V.

Example 46 includes the discretely packaged power supply component of example 39, wherein the encapsulant is a silicone compound.

Example 47 includes the discretely packaged power supply component of example 39, wherein the encapsulant is an epoxy compound.

Example 48 includes the discretely packaged power supply component of example 39, wherein the encapsulant is a urethane compound.

Example 49 includes the discretely packaged power supply component of example 39, wherein the encapsulant is a thermally-conductive compound.

Example 50 includes a power supply for a night vision system comprising an input terminal to receive source power, an output terminal to provide an operational voltage to a microchannel plate (MCP), a linear element to form a voltage divider with an internal impedance of the MCP, and a control circuit to control the linear element, wherein the linear element comprises a linear mode optical variable impedance circuit.

Example 51 includes the power supply of example 50, wherein the linear mode optical variable impedance circuit comprises a light-emitting diode (LED) optically coupled to an optical diode.

Example 52 includes the power supply of example 51, wherein the LED is an infrared LED.

Example 53 includes the power supply of example 51, wherein the LED has a brightness that varies directly with an input voltage.

Example 54 includes the power supply of example 53, wherein the input voltage varies from substantially 0V to substantially 12V.

Example 55 includes the power supply of example 50, wherein the operational voltage is a large negative voltage.

Example 56 includes the power supply of example 50, wherein the control circuit comprises an error integrator.

Example 57 includes the power supply of example 50, wherein the control circuit comprises a voltage regulator.

Example 58 includes the power supply of example 50, wherein the control circuit comprises a microcontroller.

Example 59 includes the power supply of any of examples 50-58, wherein the linear element is an encapsulated part.

DETAILED DESCRIPTION OF THE DRAWINGS

A system and method for providing an image intensifier with a photodiode switched power supply will now be described with more particular reference to the attached FIGURES. It should be noted that throughout the FIGURES, certain reference numerals may be repeated to indicate that a particular device or block is referenced multiple times across several FIGURES. In other cases, similar elements may be given new numbers in different FIGURES. Neither of these practices is intended to require a particular relationship between the various embodiments disclosed. In certain examples, a genus or class of elements may be referred to by a reference numeral ("widget 10"), while individual species or examples of the element may be referred to by a hyphenated numeral ("first specific widget 10-1" and "second specific widget 10-2").

FIG. 1 is a perspective view of a standalone night vision system 100 according to one or more examples of the present specification. Night vision system 100 may be configured for independent use, such as in a night vision monocular, or it may be mounted on a rifle for use as a nighttime-capable scope, night vision goggle, or night vision binoculars. Night vision system 100 includes a lens 110 allowing ambient light to enter, an eyepiece 120 where a user may see the enhanced image, and focus housing 104 for adjusting the focus of the image.

Figure 2:
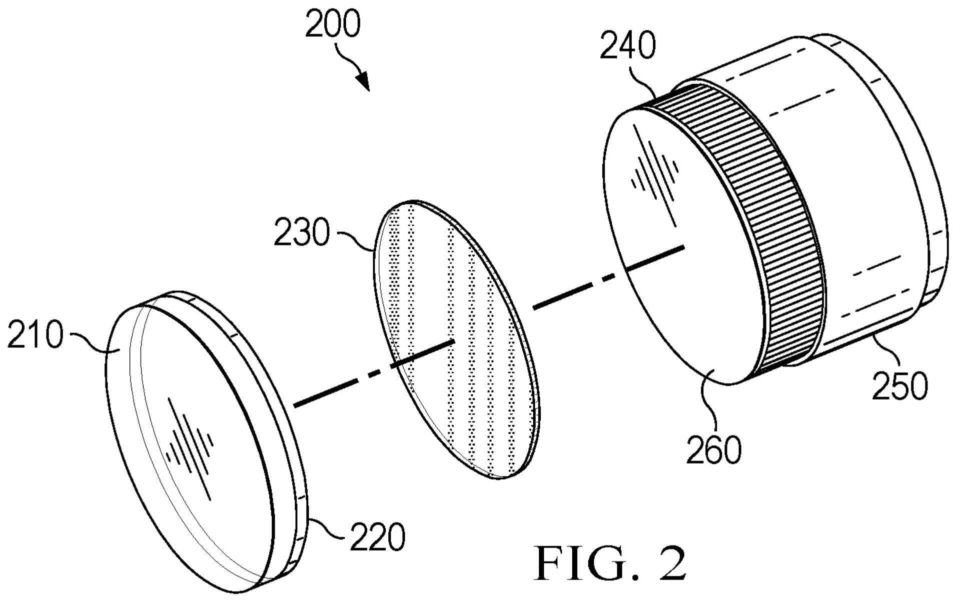
FIG. 2 is a cutaway perspective view of selected elements of an image intensifier tube according to one or more examples of the present specification.

FIG. 2 is a cutaway perspective view of an image intensifier tube (IIT) 200 for use in a night vision system 100 according to one or more examples of the present specification. IIT 200 comprises a photocathode 220, a microchannel plate (MCP) 230, and phosphor screen 260. Photocathode 220 is a very thin light-sensitive film that is bonded or deposited to the back side of a glass input face plate 210. When a photon image is applied through the input face plate 210 onto photocathode 220, photocathode 220 emits photoelectrons into the vacuum space between photocathode 220 and MCP 230. The pattern of photoelectrons emitted by photocathode 220 is a replica of the photon image. The photoelectrons are accelerated from photocathode 220 by a negative voltage applied to photocathode 220 with respect to the input face of MCP 230.

MCP 230 is a thin glass wafer with many microscopic channels running through it. A large negative voltage is applied to the input face of MCP 230 with respect to the output face of MCP 230. Each channel functions as a dynode multiplier with electronic gain dependent on the magnitude of the voltage applied across MCP 230. Photoelectrons enter and strike the walls of the channels and through the process of secondary electron emission, the incident electron flux is amplified by up to thousands of times.

Because the spatial relationship of the photoelectrons entering the channels of MCP 230 is preserved throughout the gain process, the resulting electron beam exiting MCP 230 is an intensified replica of the original image incident on photocathode 220. This electronic image is then accelerated toward phosphor screen 260 by a high voltage applied between the exit face of MCP 230 and phosphor screen 260, where the electron energy is converted into light. Phosphor screen 260 is deposited onto the input side of a fiber optic bundle 240, which directs the intensified image to its output surface for viewing by the user.

Figure 3:
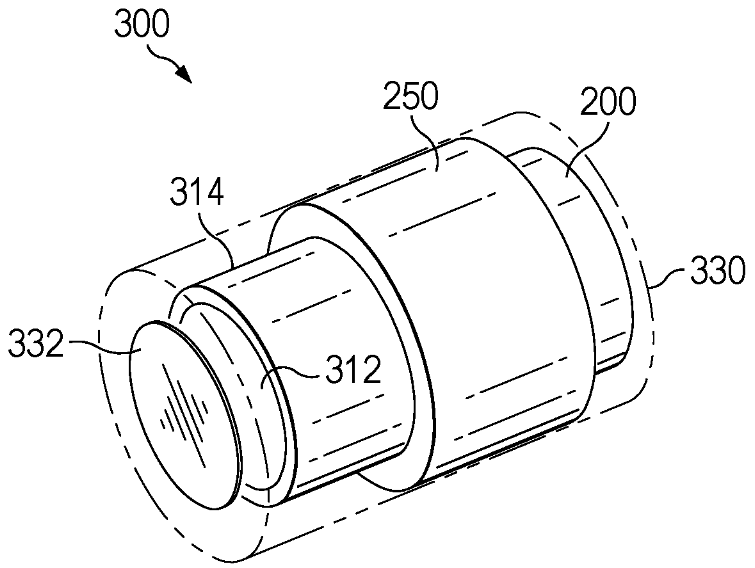
FIG. 3 is a block diagram of selected elements of an assembled image intensifier according to one or more examples of the present specification.

FIG. 3 is a perspective view of an image intensifier assembly (IIA) 300 according to one or more examples of the present specification. IIA 300 comprises image intensifier tube 200 and high voltage power supply 250, encapsulated into plastic housing 330 using a suitable high dielectric material 312 such as RTV. Dielectric material 312 is placed to completely fill the space between plastic housing 330 and the outer edge 314 of IIT 200. An aperture 332 is provided to expose face plate 210. The encapsulating material provides electrical isolation to prevent dielectric breakdown and mechanical support for maintaining proper positioning within the plastic housing.

Photocathode 220, MCP 230, and screen 260 (as seen in FIG. 2) may be provided as a pre-manufactured IIT 200. These elements are seated in close proximity to each other using a series of concentric ceramic and metal rings for electrical and hermetic isolation. A high voltage power supply 250 provides the necessary voltages to IIA 300. In some embodiments, high-voltage power supply 250 is provided as a circuit board that wraps around IIT 200. In other embodiments, power supply 250 may be provided as a more standard circuit board, such as a flat circuit board, which may have small dimensions such as a square of less than 1 inch on each side.

Figure 4:
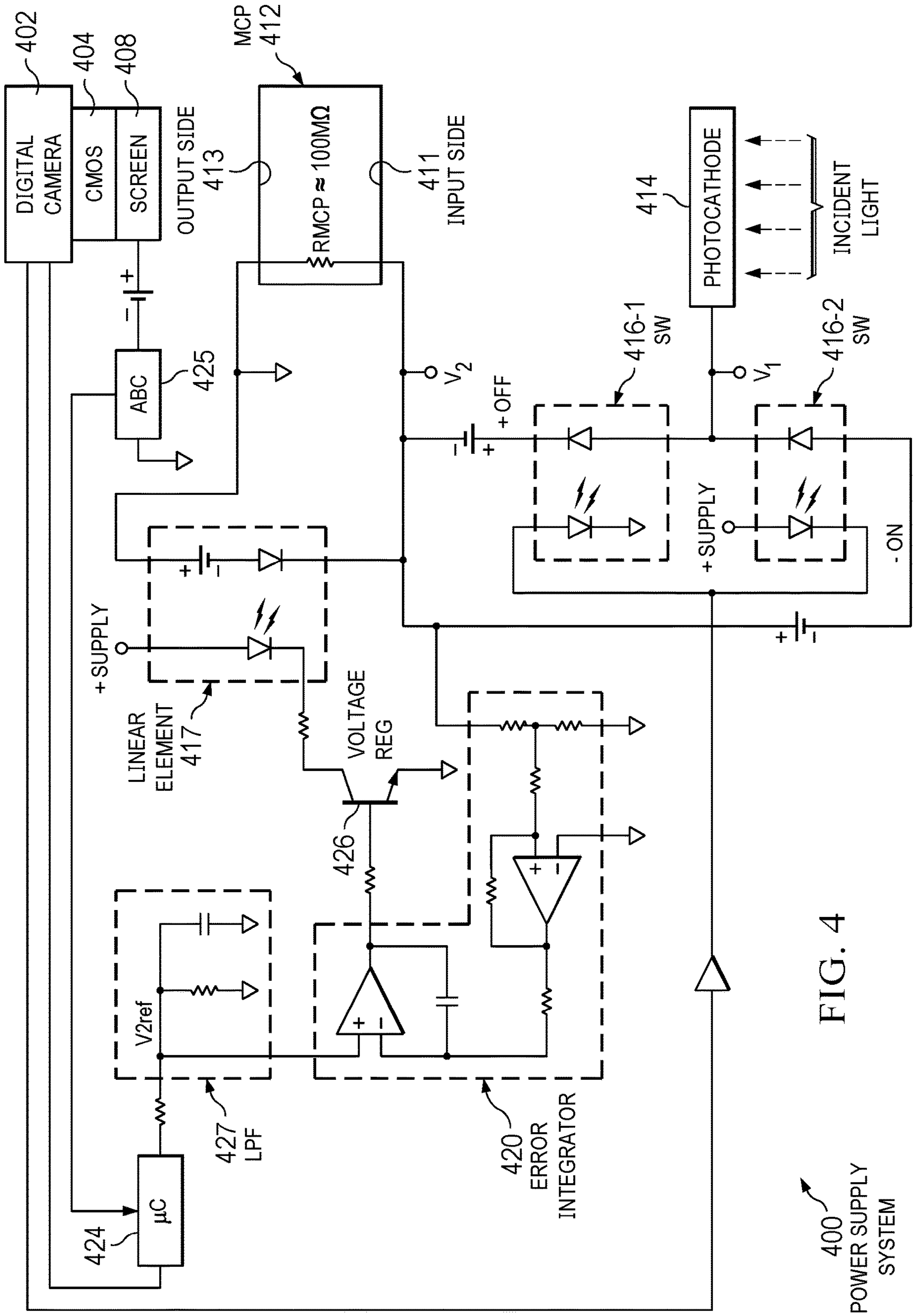
FIG. 4 is a block diagram of selected elements of an image intensifier power supply circuit, according to one or more examples of the present specification.

FIG. 4 a is a block diagram of selected elements of a power supply system 400. The circuit illustrated in FIG. 4 may provide a switched power supply, such as to increase efficiency. Some of the elements shown may be embodied in a single, discrete circuit board.

Power supply system 400 interfaces with a photocathode 414, which receives incident light at a high negative voltage, and converts the incident photons to an electron stream. Photocathode 414 is coupled via a vacuum with MCP 412. MCP 412 includes a bundle of very small fiberoptic cables, called microchannels. A large negative voltage between input face 411 and output face 413 of MCP 412 accelerates the electrons, and further causes collisions that intensify the electron stream (e.g., each individual electron entering MCP 412 is amplified into a stream of many electrons at the output face). The multiplication of input electrons results in an intensified image at output side 413.

The stream of electrons then hits phosphorous screen 408, with the output stream from each microchannel forming a single pixel of the image. On screen 408, the incident electrons are converted back to a visual image.

In an illustrative use case, a CMOS detector is affixed directly to screen 408, and digitizes the incident image. A digital camera 402 processes the image and displays it to a user. Digital camera 402 may also provide a pulse width modulation (PWM) output signal, which can be used for switching.

An automatic brightness control (ABC) circuit 425 may keep the gain within a certain range, depending on ambient conditions. For example, as night transitions into day, more light is incident on photocathode 414, so that less gain is required to provide the same brightness of image. Similarly, if a user is in a room in which the lights are suddenly switched on, the flood of brightness may be uncomfortable for the user, but ABC 425 can reduce the gain so that the image brightness remains relatively constant.

Digital camera 402 may also provide a user-selected brightness signal, which corresponds to the user's desired brightness level. As described above, ABC 425 may provide feedback to help keep the actual brightness in line with the user's selected brightness.

At a given incident light level, the circuit can adjust the observed brightness as a function of two factors: average duty cycle of the gated high-voltage input to photocathode 414, and DC voltage supplied to MCP 412.

In the case of photocathode 414, a voltage V1 is applied. If a DC voltage is supplied, then brightness varies directly with voltage. But it may be desirable to supply the maximum available voltage, as this provides greater clarity or "crispness" (i.e., resolution) to the image. To vary brightness, voltage V1 may be switched between an "active" or "on" voltage and a "passive" or "off" voltage. Because common photocathodes operate on a large negative voltage, the "on" voltage may be a high negative voltage (e.g., between −800 and −1200 Vdc), or at least greater in magnitude than −250 Vdc. The "off" voltage may be a zero voltage with respect to the MCP input face (i.e., V2), or a relatively small positive voltage, such as +40Vdc. Making the voltage slightly positive relative to the MCP input face provides better isolation between the photocathode and the MCP, as the positive voltage gates the electrons from continuing to flow through the MCP. To regulate the duty cycle of the input supplied to photocathode 414, a pair of switches 416-1 and 416-2 are slaved to the PWM signal from digital camera 402. When switch 416-1 flips on, switch 416-2 flips off. Switch 416-1 is connected to a positive "off" voltage, and switch 416-2 is connected to a negative "on" voltage, so this configuration is a passive or off configuration. On the next pulse, the PWM signal causes switch 416-1 to flip off, and switch 416-2 to flip on. This puts the circuit in the active or on configuration.

Thus, on each duty cycle, photocathode 414 is driven by the maximum available negative voltage, providing a clean image. Brightness is varied by increasing or decreasing the duty cycle. A higher duty results in greater brightness. A lower duty cycle results in less brightness, while maintaining the clarity of the image. In other embodiments, photocathode 414 can also be driven by a variable DC signal, which may result in degraded image clarity. Such degradation may be desirable in some cases, such as for export compliance.

In a commonly known configuration, high-power field-effect transistors (FETs) are used for switches 416. The power FETs may have a rating on the order of −2000V, and provide very low impedance in their "on" state, on the order of ohms or milliohms of impedance. Power FETs are also relatively large and expensive. In some cases, it may be desirable to build a power supply circuit that is much smaller, such as a profile of approximately one inch by one inch, with a thickness of a quarter inch or less. It may also be desirable to use components that are less expensive than power FETs.

In this example, an optocoupler is used as the switch. Switches 416 may comprise an LED that is driven by the input signal. The LED is placed very close to photodiode, which in an illustration is an ordinary diode with a high-voltage rating (e.g., greater than −2000V) that is initially left unpotted or unencapsulated. To ensure an optical path between the LED and the photodiode, a transparent separator (such as clear plastic, glass, or acrylic) may be disposed between the two. The diode is inherently photo sensitive in this state, as photons incident on the semiconductor substrate will allow more current to flow through the diode. Thus, the LED and the unencapsulated diode may be potted together in an opaque potting material. This may help to ensure that the only light incident on the diode is the light from the LED. The optocoupler can then be switched by alternately turning the diode on and off. When the diode is on, current flows (active state). When the diode is off, current does not flow (passive state).

One reason photodiode-based optocouplers, such as optocouplers 416, may not be common in switched power supplies is that even in the active state, they may have a relatively high impedance. For example, in the configuration described herein, an active-state optical switch or optocoupler may have an internal reactive impedance on the order of kiloohms or megaohms. Such high impedance may be traditionally viewed as undesirable or even unacceptable for an active state switching element. But in the inactive state, the optocouplers have much greater impedance, on the order of giga-ohms or tera-ohms. Thus, the impedance between the two elements, which are designed to operate in opposite states, is orders of magnitude difference. Furthermore, the current into the photocathode ($I_{photocathode}$) is large enough that the impedance through the switches, even in the kilo-ohms to megaohms range, is relatively negligible.

It may also be desirable to control the negative voltage applied to the input side of MCP 412 to control gain. While it is possible to apply a switched signal to MCP 412, it is more common to provide a variable DC voltage, illustrated here as V2. The magnitude of V2 varies directly with brightness, and is mostly independent of the duty cycle of V1. Although both V1 and V2 affect brightness, they are generally controlled independently of one another.

Because V2 is supplied by the same large DC voltage as the active voltage for photocathode 414, a linear element 417 is provided in series with MCP 412. MCP 412 itself has an internal impedance, $R_{MCP}$, on the order of 100 megaohms. Thus, the photodiode of linear element 417 forms a voltage divider with $R_{MCP}$, thus providing a variable DC input voltage at input side 411 of MCP 412.

Linear element 417 is controlled by voltage _$V2_{ref}$ from microcontroller 424, with low-pass filter 427 to filter out DC or near-DC elements. In this example, $V2_{ref}$ is illustrated as being derived from a signal provided by camera 402, which may be analog or digital. Any other suitable reference voltage may also be used.

An error integrator 420 provides negative feedback to self-regulate the voltage, keeping the drive current (which controls the brightness of the LED of linear element 417) within a nominal range, such as between (e.g., between 0 and 10 mA). Many variable impedance elements are known in the art. In this example, another optocoupler is used for similar considerations: to keep the power supply relatively small and relatively inexpensive. In this case, linear element 417 includes an LED, whose brightness depends on the magnitude of the LED current, as regulated by error integrator 420. A higher drive current makes the LED brighter, thus lowering the impedance of the photodiode of linear element 417. The lower the impedance of the photodiode, the higher the magnitude of V2 supplied to MCP 412, and the greater the gain through MCP 412.

Using optocouplers for both linear element 417 and switches 416 may result in a very small power supply circuit, on the order of 1 inch square, with a thickness of a quarter inch or less.

Figure 5:
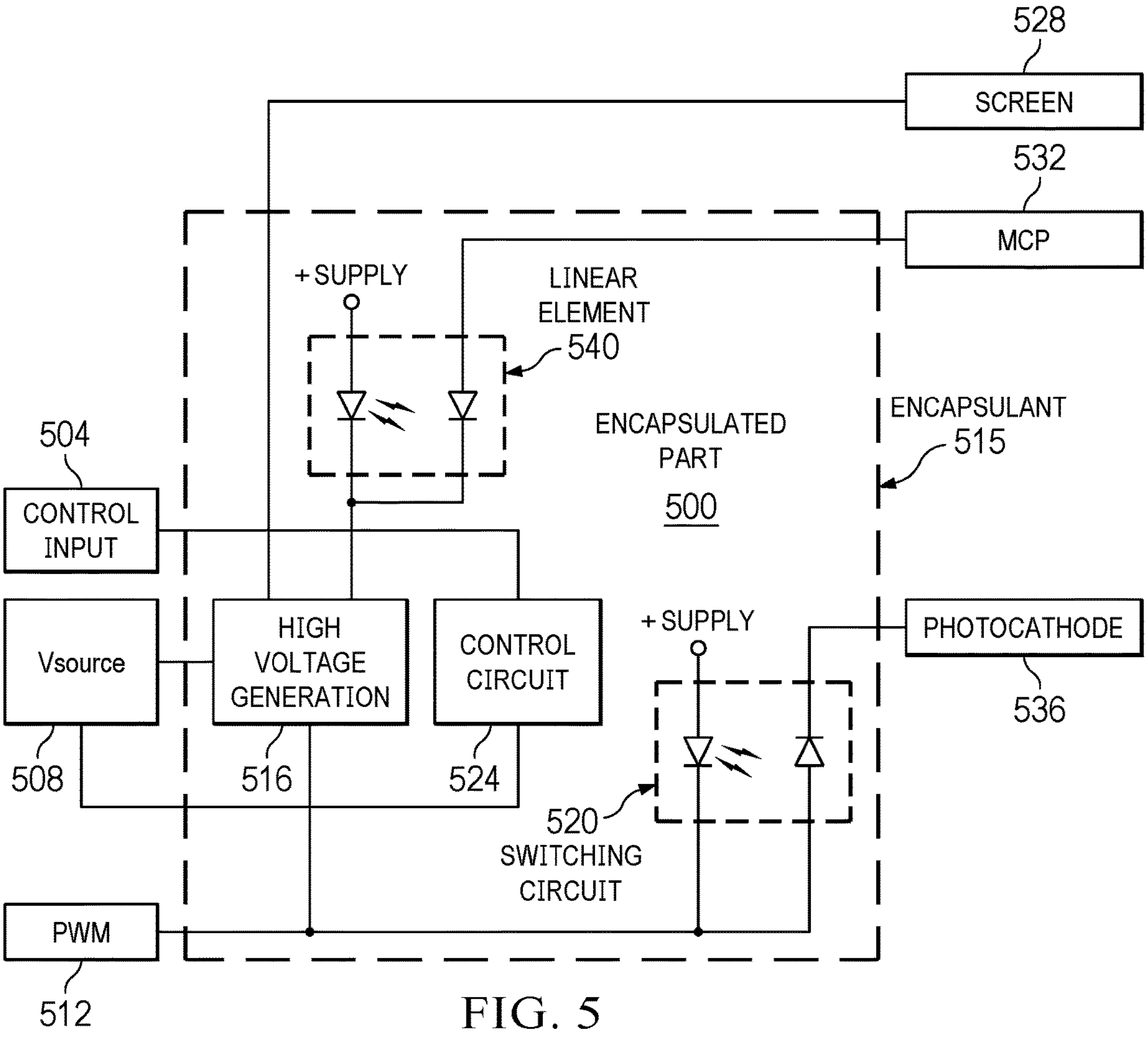
FIG. 5 is a block diagram of selected elements of a photocoupler according to one or more examples of the present specification.

FIG. 5 is a block diagram of selected elements of a gated power supply part, which is shown as an encapsulated part 500. FIG. 5 illustrates encapsulation of selected elements of a power supply, as illustrated in FIG. 4 above. Specifically, encapsulated part 500 illustrates that a linear element 540, switching circuit 520, high voltage generation circuit 516, and control circuit 524 may be encapsulated together as a discrete part.

Encapsulated part 500 receives a control input, such as from a microcontroller (e.g., microcontroller 424 of FIG. 4). A voltage source 508 provides a supply voltage, and PWM 512 provides timing for switching elements. As outputs, encapsulated part 500 provides switched high voltage inputs to an MCP 532 and photocathode 536. Those with skill in the art will recognize that certain elements correspond to parts of the disclosure of FIG. 4. For example, MCP 532 may correspond to MCP 412. Photocathode 536 may correspond to 414. Screen 528 may correspond to screen 408. Switching circuit 520 may correspond to or may include switches 416-1 and 416-2. Control circuit 524 may correspond to or include LPF 427, error integrator 420, and voltage regulator 426. Linear element 540 may correspond to or include linear element 417. Furthermore, high voltage generation circuit 516 may correspond to or may include charge pump 600 of FIG. 6.

High voltage generation circuit 516 is provided in this illustration because encapsulated part 500 may need to source high voltages such as −800 V to photocathode 536. Voltage source 508 may include one or more batteries, such as AA, AAA, C, D, or other sizes of portable batteries. Voltage source 508 may provide a relatively lower voltage, such as 1.5 V, 5 V, 9 V, 12 V, or some other DC source. Because the battery may be unable to natively provide the −800 V (or some other high voltage, e.g., a voltage with a magnitude over 250 V), high voltage generation circuit 516 may step up the voltage, trading off current for higher voltage.

Encapsulated part 500 may be driven by an external pulse with modulator (PWM) 512, which may provide the necessary timing to realize the desired duty cycle for switching circuit 520 and/or linear element 540. Use of an external PWM may enable a system integrator to use encapsulated part 500 as a discrete component, and supply any preferred duty cycle.

Switching circuit 520 may include a high-voltage diode, such as a diode rated to 2000 V. This diode may be unencapsulated, making it photosensitive. For example, when light is incident on optoswitch 520, the incident photons may cause optoswitch 520 to go leaky, thus increasing its conductivity (“closing” the switch). In that case, the diode begins to conduct current rather than act as an open switch. Light for this purpose may be supplied by an LED. When the LED is off, no photons are incident on optoswitch 520, and it does not conduct current well. Thus, the infrared LED may be disposed very close to the photodiode, although it may be undesirable for them to touch. Thus, in some embodiments, a thing transparent spacer or film may be disposed between the LED and the photodiode, to preserve the light path but keep them physically separated. When the infrared LED is switched on, the incident light changes the conductivity of the photodiode, thus “closing” the switch. When the infrared LED is switched off, optoswitch 520 is “open”. One optical switch is illustrated here to simplify the drawing, but as illustrated in FIG. 4 above, it is also possible to use a pair of optical switches that are triggered out of phase of one another by PWM 540.

The use of an optical switch 520 may realize advantages over a traditional high-power or high voltage MOSFET, which in some cases may be larger, more expensive, and/or less efficient. Advantageously, it may not be necessary to make any special modifications to optical switch 520 other than manufacturing or purchasing the diode unencapsulated. Rather, it may be an inherent property of the diode that when light is incident on the diode it becomes leaky, thus conducting more current.

In an embodiment, encapsulant 515 may also enclose linear element 540, and optionally may also include control circuit 524, which provides the voltage conditioning to convert the control input to a DC voltage of a desired magnitude. In an illustrative embodiment, linear element 540 is identical to the optical switch of 520. One difference may be that linear element 540 is operated in a linear mode. To provide switching, the voltage applied to the infrared LED may be switched between a neutral or low voltage (this keeping the LED unlit) to open the switch (inhibiting current flow). The voltage applied to the infrared LED may be switched to a maximum or nominal voltage, thus lighting the LED to or near its brightest state for the “closed” switch configuration. This maximizes current flow through optical switch 520, and minimizes impedance through optical switch 520 (which at its best, is high compared to the impedance of a transistor switch).

In contrast, linear element 540 may be an identical circuit that operates in linear mode. The difference is that instead of switching between binary maximum and minimum values, control circuit 524 controls the DC voltage driving the LED of linear element 540, keeping the voltage within a range, such as between 0V and 12V. In this case, higher voltage corresponds to a brighter LED. The brighter the LED, the greater the current flow through linear element 540, and correspondingly, the less the impedance of linear element 540, which forms a voltage divider with the internal impedance of MCP 532.

A gated power supply such as the one illustrated in block 504 may advantageously be small, light, and inexpensive. For example, an embodiment of encapsulated part 500 was manufactured with dimensions of approximately 0.964 inches on each side, and a thickness of less than ½ inch.

Because optoswitch 520 and linear element 540 are light-sensitive, it may be desirable to ensure that ambient light cannot shine on optoswitch 520 and linear element 540. Thus, in some cases it may be advantageous to pot gated power supply 504 within an encapsulant 515. Encapsulant 515 may be for example an epoxy, urethane, RTV silicon, or other encapsulant. Some designs for gated encapsulated part 500 are highly efficient and thus experience minimal resistive heating of the components. However, in some cases encapsulated part 500 may be manufactured such that it does experience conductive heating. In those cases, a thermally conductive encapsulant 515 could also be used.

In some embodiments, elements of encapsulated part 500 may be provided in a single, encapsulated or potted package. The use of optical switching elements may enable the production of very small power supply circuits, such as one inch by one inch square, with a thickness of approximately ¼ inch to ½ inch.

Figure 6:
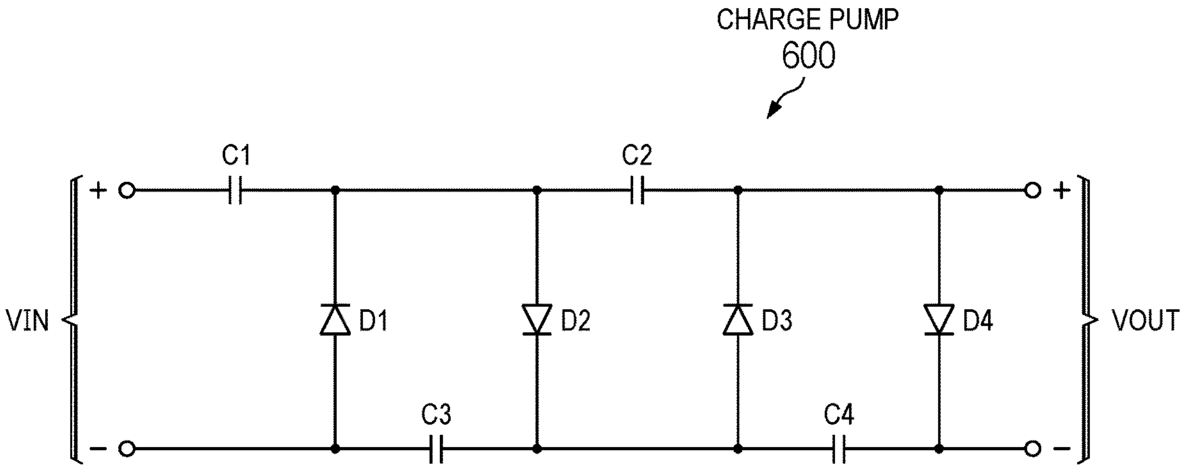
FIG. 6 is a block diagram of selected elements of a charge pump according to one or more examples of the present specification.

FIG. 6 is a block diagram of selected elements of a voltage multiplier which may be embodied in this case as a charge pump 600. Charge pump 600 should be understood to be an illustrative and nonlimiting example of a voltage multiplier. Other means of multiplying input voltages are known, such as using a transformer or others.

In the case of charge pump 600, the circuit receives an AC input voltage $V_{in}$ and outputs an output voltage $V_{out}$. Diodes $D_1$, $D_2$, $D_3$, and $D_4$ are arranged along with capacitors $C_1$, $C_2$, $C_3$, and $C_4$ in a known configuration that provides charge pump 600. For example charge pump 600 as shown is a two-stage voltage multiplier. The DC output voltage Vout in this case is substantially twice the peak-to-peak voltage of the AC input. This 2× voltage amplification is provided by way of illustration only. Voltage multiplier 524 may need to amplify the input voltage many more times than four times, in which case additional diodes and/or multiple stages may be used. The selection of the number of diodes and stages may be an ordinary engineering exercise. In one illustration, an eight-stage charge pump (using 8 diodes) may provide sufficient voltage amplification to power the circuit.

In this example, diodes $D_1$, $D_2$, $D_3$, and $D_4$ may be unencapsulated diodes, similar to optoswitch 520 of FIG. 5. In this case the diode are left unencapsulated not to take advantage of their inherent sensitivity to incident light, but rather to save size, weight, and cost. Indeed, in many cases it is not desirable to allow incident light to make diodes $D_1$, $D_2$, $D_3$, and $D_4$ leaky. Thus, these diodes may be encapsulated similar to the illustration of FIG. 5 to ensure that incident light or ambient light does not affect the operation of the diodes. (IN FIG. 5, THIS IS PART OF THAT VOLTAGE AMPLIFICATION BLOCK).

Figure 7:
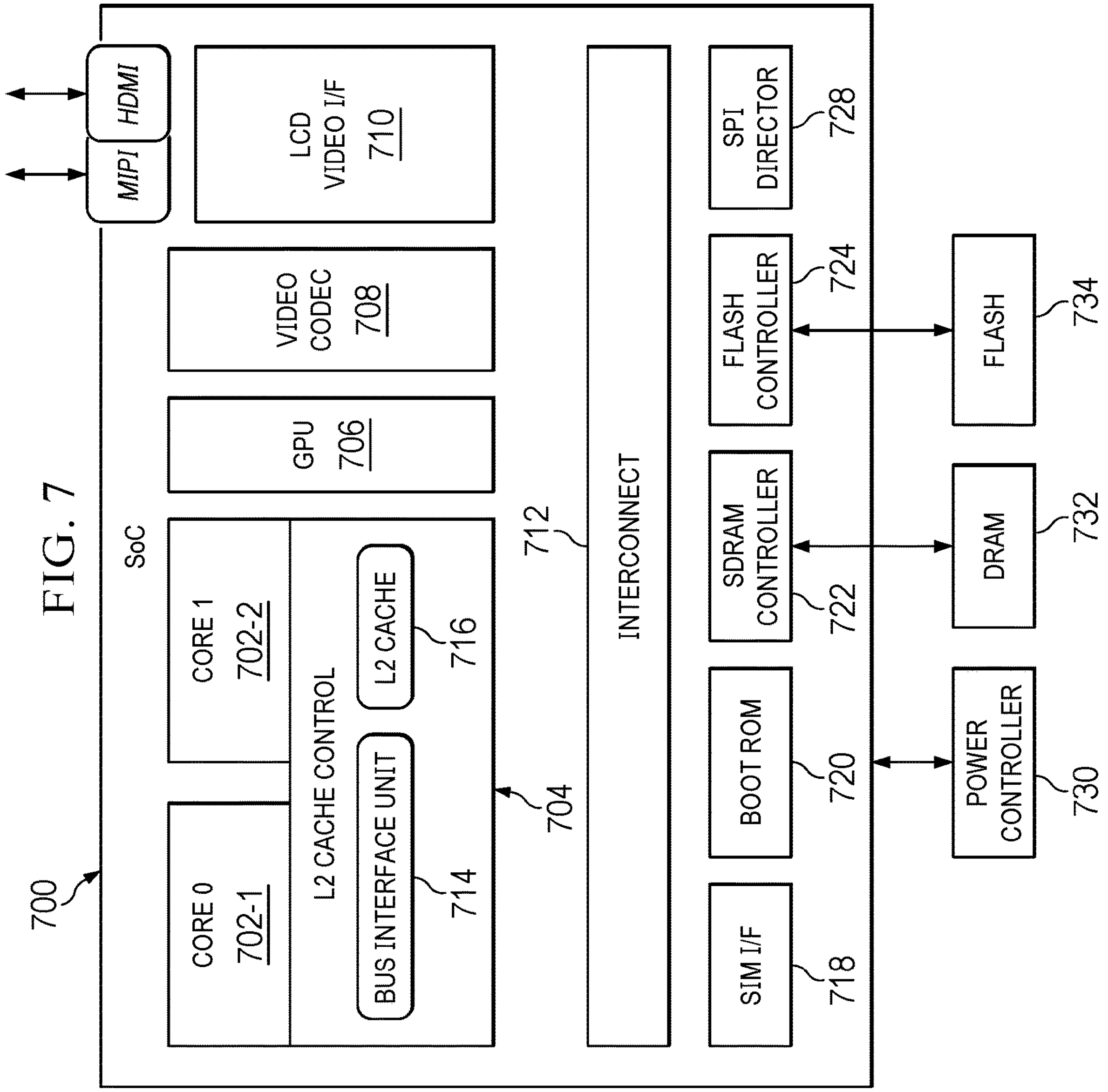
FIG. 7 is a block diagram of selected elements of a computing platform that may be used in conjunction with an image intensifier.

In some cases, it may be desirable to realize control circuit 524 of FIG. 5 as a relatively sophisticated programmable computing platform. FIG. 7 is a block diagram illustrating selected elements of an example SoC 700, which may realize a control circuit. Alternatively, the image intensifier may couple with an external control source, such as a phone or a tablet, to provide a more sophisticated user interface. SoC 700 may also be useful in cases where an image intensifier is not a portable, standalone device, but instead is mounted on a vehicle, such as a armored personnel carrier, tank, aircraft, hunting truck, or other.

At least some of the teachings of the present specification may be embodied on an SoC 700, or may be paired with an SoC 700. SoC 700 may include, or may be paired with, an advanced reduced instruction set computer machine (ARM) component. For example, SoC 700 may include or be paired with any ARM core, such as A-9, A-15, or similar. This architecture represents a hardware platform that may be useful in devices such as tablets and smartphones, by way of illustrative example, including Android phones or tablets, iPhone (of any version), iPad, Google Nexus, Microsoft Surface. SoC 700 could also be integrated into, for example, a PC, server, video processing components, laptop computer, notebook computer, netbook, or touch-enabled device.

As with hardware platform QB00 above, SoC 700 may include multiple cores 702-1 and 702-2. In this illustrative example, SoC 700 also includes an L2 cache control 704, a GPU 706, a video codec 708, a liquid crystal display (LCD) I/F 710 and an interconnect 712. L2 cache control 704 can include a bus interface unit 714, a L2 cache 716. Liquid crystal display (LCD) I/F 710 may be associated with mobile industry processor interface (MIPI)/HDMI links that couple to an LCD. LCD I/F 710 may be used, for example to provide a user interface such as a touchscreen or other than enables an end user to control features or parameters of an image intensifier.

SoC 700 may also include a subscriber identity module (SIM) I/F 718, a boot ROM 720, a synchronous dynamic random access memory (SDRAM) controller 722, a flash controller 724, a serial peripheral interface (SPI) director 728, a suitable power control 730, a dynamic RAM (DRAM) 732, and flash 734. In addition, one or more embodiments include one or more communication capabilities, interfaces, and features such as instances of Bluetooth, a 3G modem, a global positioning system (GPS), and an 802.11 Wi-Fi. By way of illustrative example, a Bluetooth connection may be used to communicatively couple SoC 700 to an external image intensifier. This remote connection may be used to control parameters of the image intensifier, such as the FOM, duty cycle, brightness, or to control options such as extra information (e.g., "heads up display" or HUD data) that may be displayed by the image intensifier. In cases where export compliance is a concern, certain limits may be "hard coded" into the software, so that the limits cannot be programmatically exceeded.

Designers of integrated circuits such as SoC 700 (or other integrated circuits) may use intellectual property blocks (IP blocks) to simplify system design. An IP block is a modular, self-contained hardware block that can be easily integrated into the design. Because the IP block is modular and self-contained, the integrated circuit (IC) designer need only "drop in" the IP block to use the functionality of the IP block. The system designer can then make the appropriate connections to inputs and outputs.

IP blocks are often "black boxes." In other words, the system integrator using the IP block may not know, and need not know, the specific implementation details of the IP block. Indeed, IP blocks may be provided as proprietary third-party units, with no insight into the design of the IP block by the system integrator.

For example, a system integrator designing an SoC for a smart phone may use IP blocks in addition to the processor core, such as a memory controller, a nonvolatile memory (NVM) controller, Wi-Fi, Bluetooth, GPS, a fourth or fifth-generation network (4G or 5G), an audio processor, a video processor, an image processor, a graphics engine, a GPU engine, a security controller, and many other IP blocks. In many cases, each of these IP blocks has its own embedded microcontroller.

The foregoing outlines features of several embodiments so that those skilled in the art may better understand various aspects of the present disclosure. The foregoing detailed description sets forth examples of apparatuses, methods, and systems relating to a system for providing a gated power supply accordance with one or more embodiments of the present disclosure. Features such as structure(s), function(s), and/or characteristic(s), for example, are described with reference to one embodiment as a matter of convenience; various embodiments may be implemented with any suitable one or more of the described features.

As used throughout this specification, the phrase "an embodiment" is intended to refer to one or more embodiments. Furthermore, different uses of the phrase "an embodiment" may refer to different embodiments. The phrases "in another embodiment" or "in a different embodiment" refer to am embodiment different from the one previously described, or the same embodiment with additional features. For example, "in an embodiment, features may be present. In another embodiment, additional features may be present." The foregoing example could first refer to an embodiment with features A, B, and C, while the second could refer to an embodiment with features A, B, C, and D, with features, A, B, and D, with features, D, E, and F, or any other variation.

In the foregoing description, various aspects of the illustrative implementations may be described using terms commonly employed by those skilled in the art to convey the substance of their work to others skilled in the art. It will be apparent to those skilled in the art that the embodiments disclosed herein may be practiced with only some of the described aspects. For purposes of explanation, specific numbers, materials, and configurations are set forth to provide a thorough understanding of the illustrative implementations. In some cases, the embodiments disclosed may be practiced without the specific details. In other instances, well-known features are omitted or simplified so as not to obscure the illustrated embodiments.

For the purposes of the present disclosure and the appended claims, the article "a" refers to one or more of an item. The phrase "A or B" is intended to encompass the "inclusive or," e.g., A, B, or (A and B). "A and/or B" means A, B, or (A and B). For the purposes of the present disclosure, the phrase "A, B, and/or C" means A, B, C, (A and B), (A and C), (B and C), or (A, B, and C).

The embodiments disclosed can readily be used as the basis for designing or modifying other processes and structures to carry out the teachings of the present specification. Any equivalent constructions to those disclosed do not depart from the spirit and scope of the present disclosure. Design considerations may result in substitute arrangements, design choices, device possibilities, hardware configurations, software implementations, and equipment options.

As used throughout this specification, a "memory" is expressly intended to include both a volatile memory and a nonvolatile memory. Thus, for example, an "engine" as described above could include instructions encoded within a volatile or nonvolatile memory that, when executed, instruct a processor to perform the operations of any of the methods or procedures disclosed herein. It is expressly intended that this configuration reads on a computing apparatus "sitting on a shelf" in a non-operational state. For example, in this example, the "memory" could include one or more tangible, nontransitory computer-readable storage media that contain stored instructions. These instructions, in conjunction with the hardware platform (including a processor) on which they are stored may constitute a computing apparatus.

In other embodiments, a computing apparatus may also read on an operating device. For example, in this configuration, the "memory" could include a volatile or run-time memory (e.g., RAM), where instructions have already been loaded. These instructions, when fetched by the processor and executed, may provide methods or procedures as described herein.

In yet another embodiment, there may be one or more tangible, nontransitory computer-readable storage media having stored thereon executable instructions that, when executed, cause a hardware platform or other computing system, to carry out a method or procedure. For example, the instructions could be executable object code, including software instructions executable by a processor. The one or more tangible, nontransitory computer-readable storage media could include, by way of illustrative and nonlimiting example, a magnetic media (e.g., hard drive), a flash memory, a ROM, optical media (e.g., CD, DVD, Blu-Ray), nonvolatile random access memory (NVRAM), nonvolatile memory (NVM) (e.g., Intel 3D Xpoint), or other nontransitory memory.

There are also provided herein certain methods, illustrated for example in flow charts and/or signal flow diagrams. The order or operations disclosed in these methods discloses one illustrative ordering that may be used in some embodiments, but this ordering is no intended to be restrictive, unless expressly stated otherwise. In other embodiments, the operations may be carried out in other logical orders. In general, one operation should be deemed to necessarily precede another only if the first operation provides a result required for the second operation to execute. Furthermore, the sequence of operations itself should be understood to be a nonlimiting example. In appropriate embodiments, some operations may be omitted as unnecessary or undesirable. In the same or in different embodiments, other operations not shown may be included in the method to provide additional results.

In certain embodiments, some of the components illustrated herein may be omitted or consolidated. In a general sense, the arrangements depicted in the FIGURES may be more logical in their representations, whereas a physical architecture may include various permutations, combinations, and/or hybrids of these elements.

With the numerous examples provided herein, interaction may be described in terms of two, three, four, or more electrical components. These descriptions are provided for purposes of clarity and example only. Any of the illustrated components, modules, and elements of the FIGURES may be combined in various configurations, all of which fall within the scope of this specification.

In certain cases, it may be easier to describe one or more functionalities by disclosing only selected element. Such elements are selected to illustrate specific information to facilitate the description. The inclusion of an element in the FIGURES is not intended to imply that the element must appear in the disclosure, as claimed, and the exclusion of certain elements from the FIGURES is not intended to imply that the element is to be excluded from the disclosure as claimed. Similarly, any methods or flows illustrated herein are provided by way of illustration only. Inclusion or exclusion of operations in such methods or flows should be understood the same as inclusion or exclusion of other elements as described in this paragraph. Where operations are illustrated in a particular order, the order is a nonlimiting example only. Unless expressly specified, the order of operations may be altered to suit a particular embodiment.

Other changes, substitutions, variations, alterations, and modifications will be apparent to those skilled in the art. All such changes, substitutions, variations, alterations, and modifications fall within the scope of this specification.

To aid the United States Patent and Trademark Office (USPTO) and, any readers of any patent or publication flowing from this specification, the Applicant: (a) does not intend any of the appended claims to invoke paragraph (f) of 35 U.S.C. section 112, or its equivalent, as it exists on the date of the filing hereof unless the words "means for" or "steps for" are specifically used in the particular claims; and (b) does not intend, by any statement in the specification, to limit this disclosure in any way that is not otherwise expressly reflected in the appended claims, as originally presented or as amended.

What is claimed is:

1. A gated power supply for an image intensifier comprising an input terminal to receive source power, and output terminal to electrically couple to a photocathode, a first voltage source to source a non-active voltage to the photocathode, a second voltage source to source a large negative voltage to the photocathode, and a switching circuit to switch between the first voltage source and the second voltage source on a duty cycle, wherein the switching circuit comprises an optically-coupled switch.

2. The gated power supply of claim 1, wherein the optically-coupled switch comprises a high-voltage unencapsulated diode proximate to a light source controlled by the switching circuit.

3. The gated power supply of claim 2, wherein the light source is an infrared light-emitting diode.

4. The gated power supply of claim 1, further comprising an input terminal to receive source power, and a voltage multiplier circuit to multiply the source power to the large negative voltage.

5. The gated power supply of claim 4, wherein the voltage multiplier circuit comprises a charge pump.

6. The gated power supply of claim 5, wherein the charge pump comprises a plurality of unencapsulated high-voltage diodes.

7. The gated power supply of claim 1, wherein the first voltage source is approximately +40V.

8. The gated power supply of claim 1, wherein the second voltage source is greater than 500V in magnitude from the first voltage source.

9. The gated power supply of claim 1, wherein the second voltage source is approximately −800V.

10. An image intensification system, comprising:

an image intensifier assembly comprising a photocathode coupled via a vacuum to a microchannel plate (MCP) electrically coupled to a screen;

a battery power source to provide a supply voltage;

a control circuit, including or operating with a pulse width modulator (PWM); and a switching power supply, comprising:

a voltage multiplier circuit to multiply the supply voltage to a large negative voltage;

a first supply circuit to provide a first operational voltage from the large negative voltage to the photocathode, wherein the first supply circuit comprises a pair of switches configured to operate out of phase of one another, based on the PWM, wherein a first switch is in an inactive mode when a second switch is in an active mode, and wherein the first switch is coupled to a neutral or positive supply and the second switch is coupled to a negative supply, wherein the first and second switches are optically actuated; and a second supply circuit to provide a second operational voltage to the MCP, comprising a linear element in series with an internal impedance of the MCP, wherein the linear element is a variable impedance optical circuit controlled by a control voltage.

11. The image intensification system of claim 10, wherein the large negative voltage is approximately −800V.

12. The image intensification system of claim 10, wherein the switching power supply is potted within an encapsulant.

13. The image intensification system of claim 10, wherein the linear element comprises a light-emitting diode (LED) optically coupled to an optical diode.

14. A discretely packaged power supply component, comprising:

a first input terminal to receive a source power;

a second input terminal to receive a switching signal from a pulse width modulator;

an output terminal to provide a switched high-voltage output;

a voltage multiplier circuit to step up the source power to a high-magnitude direct current (DC) voltage; and an optical switch comprising a light-emitting diode (LED) to operate on the switching signal, wherein the LED is proximate to an unencapsulated high-voltage diode disposed to switch the output terminal between the high-magnitude DC voltage and a neutral or small-magnitude voltage of opposite polarity to the high-magnitude DC voltage;

wherein the discretely packaged power supply component is potted within an encapsulant.

15. The discretely packaged power supply component of claim 14, wherein the LED is an infrared LED.

16. The discretely packaged power supply component of claim 14, further comprising a charge pump, including a plurality of unencapsulated high-voltage diodes.

17. The discretely packaged power supply component of claim 14, wherein the encapsulant is a silicone compound.

18. The discretely packaged power supply component of claim 14, wherein the encapsulant is an epoxy compound.

19. The discretely packaged power supply component of claim 14, wherein the encapsulant is a urethane compound.

20. The discretely packaged power supply component of claim 14, wherein the encapsulant is a thermally-conductive compound.

* * * * *